C. M. TRAMMELL.
DEVICE FOR HOLDING TIRES UPON AUTOMOBILES.
APPLICATION FILED OCT. 25, 1919.
1,350,897.
Patented Aug. 24, 1920.
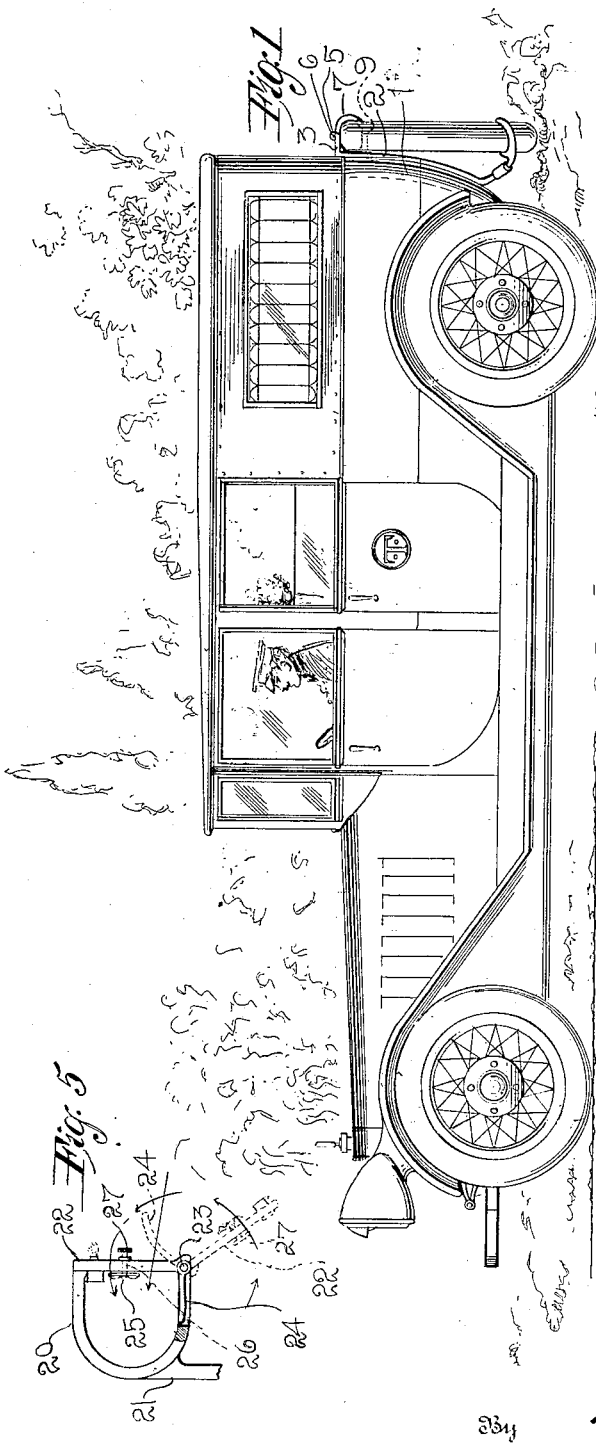
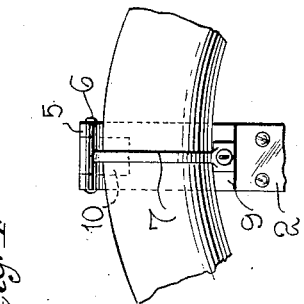
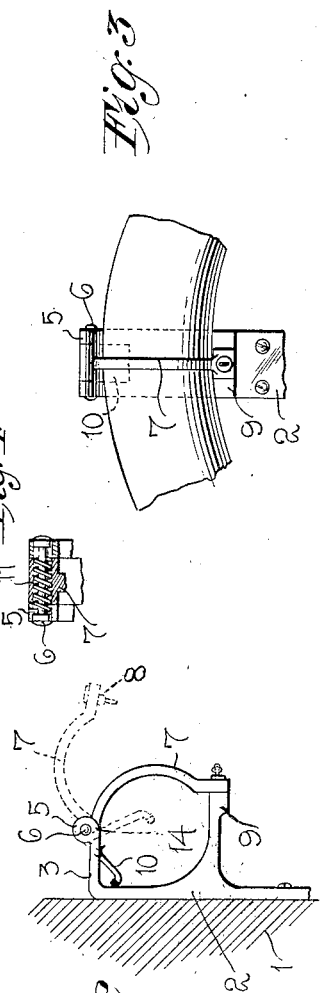
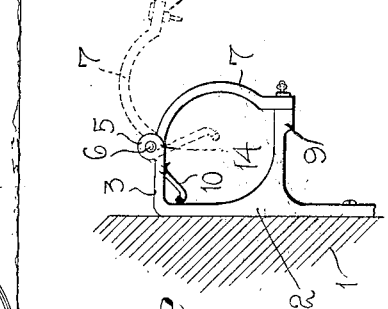
Inventor
C. M. Trammell
By Franklin H. Hough
Attorney

UNITED STATES PATENT OFFICE.

CHARLES M. TRAMMELL, OF LAKELAND, FLORIDA, ASSIGNOR OF ONE-HALF TO EDWARD A. HENSKE, OF WASHINGTON, DISTRICT OF COLUMBIA.

DEVICE FOR HOLDING TIRES UPON AUTOMOBILES.

1,350,897.  Specification of Letters Patent.  Patented Aug. 24, 1920.

Application filed October 25, 1919. Serial No. 333,284.

*To all whom it may concern:*

Be it known that I, CHARLES M. TRAMMELL, a citizen of the United States, residing at Lakeland, in the county of Polk and State of Florida, have invented certain new and useful Improvements in Devices for Holding Tires upon Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in device for holding extra tires upon automobile bodies, and consists of a simple and efficient device of this nature having various details of construction, combination and arrangement of parts which will be hereinafter fully described, shown in the accompanying drawings and then specifically defined in the appended claim.

My invention is illustrated in the accompanying drawings which, with the numerals of reference marked thereon, form a part of this application, and in which:

Figure 1 is a side elevation, showing the application of my invention to the body of an automobile.

Fig. 2 is a detail edge view showing the device applied to the body of a car.

Fig. 3 is a front elevation of the detail shown in Fig. 2.

Fig. 4 is a sectional view on line 4—4 of Fig. 2, and

Fig. 5 is a detail in elevation of the preferred form of the invention.

Reference now being had to the details of the invention by numerals:

1 designates the body of an automobile and 2 is a bracket member secured to the body of the car and having a laterally extending portion 3 terminating in bearings 5 in which a pivot 6 is rotatable, upon which pivot the inner end of the curved arm 7 is mounted carrying a key operated latch 8 at its free end which is adapted to engage a socket in the lower angled arm 9 of said bracket member. Said arm has an integral resiliently mounted finger 10, the free end of which is curved as shown, and against which a tire is adapted to contact when inserted in the bracket member and which is provided for the purpose of throwing the latch arm into a closed position.

A coiled spring 11 is mounted upon the pin 6 and attached to the arm 7 and the bracket extension 3, and tends to normally hold the arm when released by removal of the tire in the position shown in dotted lines of Fig. 2 of the drawings.

In Fig. 5 of the drawings the form of holding device consists of a U-shaped member 20 having a supporting arm 21, and 22 designates a tire retaining element which is pivotally mounted upon a pin 23 carried by one arm of said member, and 24 is a finger integral with the element 22 and against which a tire is adapted to contact when inserted in the U-shaped portion of the bracket member, causing said element to close to the position shown in Fig. 5, and in which position a latch carried by said element will engage and be held in the end of the curved member 20.

When a tire of smaller diameter than the one which would be engaged by the element 22 is placed within the holder, it may be held securely by the attachment consisting of a disk 25, having a threaded stem 26 with a hand wheel 27 at its end, said stem being mounted in the threaded aperture of the element 22. In the preferred form the spring is dispensed with, the tire engaging element falling by gravity to the position shown in dotted lines.

Obviously, of course, the auxiliary tire retaining member, comprising the disk 25, carried by the threaded stem 26, having the manipulating element 27, may be used in connection with the devices of Figs. 1 to 4.

What I claim to be new is:

In a device for holding tires upon automobiles, the combination of a bracket securable to an automobile and having a U-shaped portion, a tire retaining element comprising a longer and an angled shorter arm, said element being pivoted to one of the ends of said U-shaped portion and automatically operable co-acting, positive locking means carried by said longer arm and said end of the U-shaped portion for positively locking said longer arm to said end of the U-shaped portion, when said longer arm is moved against said U-shaped bracket end.

In testimony whereof I hereunto affix my signature.

CHARLES M. TRAMMELL.